Patented June 11, 1929.

1,717,153

UNITED STATES PATENT OFFICE.

CHARLES T. HENNIG, OF CLEVELAND, OHIO.

METHOD OF DESULPHURIZING STEEL.

No Drawing.　　Application filed August 7, 1924.　Serial No. 730,723.

This invention relates to the manufacture of basic steel, either in the open hearth or the electric furnace and more particularly to processes of desulphurizing and purifying the metal.

One of the objects of the invention is to provide a process of desulphurizing and purifying steel that will overcome the objectionable features of methods heretofore used and produce a denser and stronger steel that will reduce loss due to sponginess and segregation to a minimum.

A further object of the invention is to provide a process of desulphurizing and purifying that will permit the use of less manganese and, therefore, produce a steel that is better adapted for making welded pipe and other welded products.

A further object of the invention is to provide a method of desulphurizing and purifying that will produce a steel having a minimum of included slag and oxides and which will therefore, have a minimum of surface defects, especially when rolled into thin sheets and strips.

In practicing my invention in the basic open hearth process I follow the usual procedure of first charging lime or limestone and then charging the metal, either hot or cold, or part hot metal and part cold metal, according to the practice of the plant. In cases where it is customary to charge both hot and cold metal, the latter is charged first and, after the melting and refining action on that part of the charge has been carried on for a time, the hot metal is charged and, according to my preferred mode of procedure, the hot metal is treated with soda, as will be hereinafter described, either in the mixer or transfer ladle by which the metal is transferred to the open hearth furnace. The slag on the iron, thus treated, is not removed but is poured into the open hearth furnace with the metal where it mixes with the basic slag and makes the latter more fluid and permits the soda to continue its action on the impurities. If the entire charge consists of hot metal it is preferable to treat it all with the soda in the mixer or transfer ladle. After allowing the usual time for desiliconizing and decarbonizing, with the addition of iron ore or other iron oxides, and when the desiliconization and decarbonization are nearly complete, if the bath is still too high in impurities, I charge sodium carbonate, in the form of lumps, cakes or briquettes, by means of a shovel, peel, canister or charging box. In cases where recarbonization, prior to tapping, is not practiced, the sodium carbonate should be charged from fifteen to thirty minutes before tapping. In cases where it is the practice to recarbonize the metal, prior to tapping, the sodium carbonate should be charged just ahead of the recarbonizing material. The amount of sodium carbonate to be used will depend upon the amount of sulphur and other impurities to be removed and will run about one pound per ton of metal of the total charge for every one one-hundredth of one percent of the sulphur to be removed. In charging the sodium carbonate directly into the open hearth furnace it should be distributed fairly uniformly over the surface of the slag, some care being advisable to keep the material away from the furnace walls as it might react with the lining.

The sodium carbonate melts and the boiling of the metal and the slag causes the sodium carbonate to be thoroughly mixed with the slag, making the latter more liquid and thereby permitting the gases from the metal to rise through the slag more easily and thereby increasing the boiling action in the slag. This boiling action brings the metal into intimate contact with the sodium carbonate because the metal, in the upper strata of the bath, which contain the oxides, phosphides, sulphides and silicides, is carried up through the slag, in the form of ripples and cones, the surfaces of which are washed by the slag. The sulphur is in the metal in the form of iron sulphides, which are of lower specific gravity than the metal itself and hence the sulphur is largely contained in the upper strata of the metal, where it meets the sodium carbonate, as above described, and is decomposed, the sulphur combining with the sodium to form sodium sulphides and the carbon dioxide rising through the slag and increasing the boiling action. The sodium sulphides, rising to the surface of the slag, are subjected to the oxidizing flame, within the furnace, and a portion of them is decomposed, the sulphur passing off with the gases as sulphur dioxide and the sodium, thus released, again reacts with the iron sulphides and thus takes out more sulphur, this process continuing until the metal is tapped off.

In cases where the soda is charged directly into the open hearth furnace it is preferable to do this after the silicon has been reduced to the desired content and has combined with the lime slag, which has a greater affinity for the silicon than the sodium has. The sodium has a greater affinity for sulphur than for silicon but the sodium carbonate melts at a much lower temperature than that at which the lime slag melts and, therefore, if the sodium carbonate is charged with the lime, or while there is a relatively large amount of silicon still in the metal, some of the sodium will combine with the silicon, notwithstanding the greater affinity for sulphur, and thus a part of the sodium carbonate would be consumed in taking out silicon, making it necessary to charge more sodium carbonate than would be required if all of it reacted with the sulphur. Since lime is a much cheaper material than sodium carbonate it is preferable to have the silicon combine with the lime slag so as to have all of the sodium carbonate available for removing the sulphur.

The removal of the sulphur may be facilitated by using a wooden pole or stick to stir up the bath after the sodium carbonate has been charged. There is thus effected a dry distillation of the wood, producing hydrocarbons and superheated steam, the carbon in the wood forming carbon monoxide which reacts upon the oxides of the metal and reduces them. The hydrocarbons and steam are decomposed and the gases thus formed, in rising through the metal, create a violent boiling and thus assist in bringing the impurities to the surface and forcing them through the slag so that opportunity is afforded for the sodium carbonate to react upon the sulphides.

It is common practice in some open hearth steel plants, and particularly those employing tilting furnaces, to run out the slag before tapping off the metal and in such cases it is preferable to charge the sodium carbonate after the usual amount of slag has been removed. The final slag thus formed contains a relatively high percentage of the sodium carbonate and the reaction with the sulphides is thus facilitated.

The preferred manner of using the soda in the mixer or transfer ladle is to put the required amount of sodium carbonate in the ladle before the metal is run in and then, as the metal runs into the ladle, the molten sodium carbonate is churned up with it and thus brought into intimate contact with the sulphides, which are decomposed and carbon dioxide given off. The carbon dioxide, in escaping from the metal, produces a lively agitation which brings the oxides and other impurities to the top and also brings the sodium into intimate relation with all parts of the molten mass, thus giving opportunity for the sulphur to combine with the sodium and form a sodium sulfide slag which, owing to its low specific gravity and high fluidity, is readily forced to the surface. During this action occluded gases are also carried to the surface and escape. Instead of putting the sodium carbonate in the bottom of the ladle it may be thrown in as the metal is being tapped from the furnace and when a few inches of metal has accumulated in the ladle. Another way is to gradually throw the sodium carbonate into the runner while the furnace is being tapped and thus allow it to be carried into the ladle with the stream of metal.

By treating the slag, on the surface of the metal in the ladle, with a jet of steam or a fine spray of water the sodium sulfide in the slag will be decomposed and the sulphur will be oxidized, forming sulphur dioxide which will escape. The sodium thus released will react upon more of the iron sulfides and form more sodium sulfides, thus repeating the cycle of reactions.

For using my invention in the ladles in which the metal is transferred from the mixer to the open hearth furnace, cakes or lumps of sodium carbonate are put in the bottom of the ladle and the metal then runs in. This treatment will be used, preferably, instead of treating the metal in the converter or open hearth furnace, as previously described, but the amount of sodium carbonate to be used will be determined by the amount of sulphur to be removed, as above stated. The molten metal melts the sodium carbonate, which will be decomposed and the carbon dioxide given off will cause the metal to boil freely and thus drive off occluded gases. The action in all respects is similar to that previously described with reference to the treatment of the metal in the pouring ladle.

While I prefer to use sodium carbonate, on account of its low cost and being always available in the market, because of its being manufactured in enormous quantities, it is possible to use, in some instances, sodium bicarbonate, potassium carbonate magnesium carbonate and other carbonates of the alkali metals, but these are usually more expensive than sodium carbonate and many of them introduce detrimental conditions that may be avoided by the use of sodium carbonate.

Having thus described my invention, what I claim is:

1. The herein described method of purifying steel in the course of its manufacture by the basic open hearth process which consists in mixing soda into the molten iron forming a part of the charge prior to its introduction into the open hearth furnace and thereby causing the metal to be violently agitated and boiled by the gases given off by the soda and forming a soda-containing slag on the metal that is of relatively higher fluidity than the ordinary basic slag, then running the iron thus treated, together with the slag thereon, into a bath of partially refined metal in the open hearth furnace and continuing the boiling of the metal in the open hearth furnace until the oxides and sulphides have been eliminated from the metal to the required extent.

2. The herein described method of purifying steel in the course of its manufacture by the basic open hearth process which consists in mixing soda into the molten iron forming a part of the charge prior to its introduction into the open hearth furnace and thereby causing the metal to be violently agitated and boiled by the gases given off by the soda and forming a soda-containing slag on the metal that is of relatively higher fluidity than the ordinary basic slag, then running the iron thus treated, together with the slag thereon, into a bath of partially refined metal in the open hearth furnace and continuing the boiling of the metal in the open hearth furnace until the oxides and sulphides have been eliminated from the metal to the required extent, and introducing wood into the bath of metal during the boiling stage to facilitate the reduction of the oxides and to increase the boiling action.

In testimony whereof I affix my signature.

CHARLES T. HENNIG.